Sept. 18, 1951  Q. J. EVANS  2,568,061
ROTARY SHAFT DRIVEN TAPPET
Filed Oct. 27, 1947  2 Sheets-Sheet 1

INVENTOR.
QUENTIN J. EVANS
BY

Sept. 18, 1951  Q. J. EVANS  2,568,061
ROTARY SHAFT DRIVEN TAPPET
Filed Oct. 27, 1947  2 Sheets-Sheet 2

*INVENTOR.*
QUENTIN J. EVANS
BY

Patented Sept. 18, 1951

2,568,061

UNITED STATES PATENT OFFICE 2,568,061

ROTARY SHAFT DRIVEN TAPPET

Quentin J. Evans, New York, N. Y., assignor to the United States of America as represented by the United States Atomic Energy Commission Application October 27, 1947, Serial No. 782,448

4 Claims. (Cl. 200—34)

This invention relates to a tappet operated by a rotatable shaft and more particularly this invention relates to a novel type of positive tappet design for operation by a rotatable shaft at a predeterminable time interval from the instant the shaft is stationary.

The present invention is directed toward the control by a rotatable shaft of an external device for short lengths of time immediately following the start of rotation of the shaft or immediately prior to or following the last revolution made by the shaft. Such control may be desired, for example, for the purpose of supplying a lubricant to a gas lubricated bearing for a short period of time before the shaft has come to a dead stop.

One of the objects of this invention is to provide a simple, delayed action tappet responsive to stops and starts in the rotation of a shaft.

Another of the objects of this invention is to provide an electrical switch to break an electrical circuit a relatively short time after a shaft begins to rotate and to make the circuit immediately before the shaft comes to rest.

Still another of the objects is to provide a positive tappet operable only at a predeterminable time interval from the dead stop position of a rotary shaft.

Other objects, advantages and modifications of this invention will become apparent in the following description.

The foregoing objects are accomplished by mounting on a shaft a sleeve bearing freely rotatable about the shaft and counterbalanced in a direction opposite to the rotation of the shaft. A liquid film is provided between the surface of the sleeve bearing and the surface of the shaft, and a stop is provided to limit the rotation of the sleeve bearing to less than 1 revolution. An external device may be operated by means of convenient lever arms and the like mounted on the sleeve bearing. A damper may be provided for smoothing or adjusting the speed of operation of the tappet.

When the shaft begins to rotate it exerts a torque on the liquid film between the bearing and the shaft, and this torque is transmitted to the bearing, acting to overcome the opposing unbalance of the bearing. When the shaft has reached a sufficiently high speed of rotation, the opposing unbalance of the bearing is overcome, and the bearing turns in the direction of rotation of the shaft. The bearing is prevented from rotating completely about the shaft by the stop which allows only a fraction of one revolution. This movement may be transmitted through convenient means, such as a lever arm rigidly mounted on the bearing, to operate an external device. When the shaft is coming to a stop the drag of the liquid film diminishes until it is insufficient to overcome the unbalance of the bearing, and this unbalance causes the bearing to rotate in the direction opposite to that of the shaft to operate the external device before the shaft comes to rest. The speed of rotation of the shaft, or the time interval from a dead stop, at which the tappet is moved may be regulated by choosing a liquid with a particular viscosity for use between the bearing surface and the shaft, by adjusting degree of unbalance of the bearing and, when a damper is employed, by adjusting the amount of damping applied. These factors also control the rate at which the bearing turns about the rotating shaft.

One embodiment of the invention will be described hereinafter in detail with the understanding that the invention is not limited to the specific details disclosed. The tappet as shown in the accompanying drawing is used as a make-and-break element in an electric circuit by employing a conventional bridge and mercury cups as the contacts. In the drawings.

Figure 1:
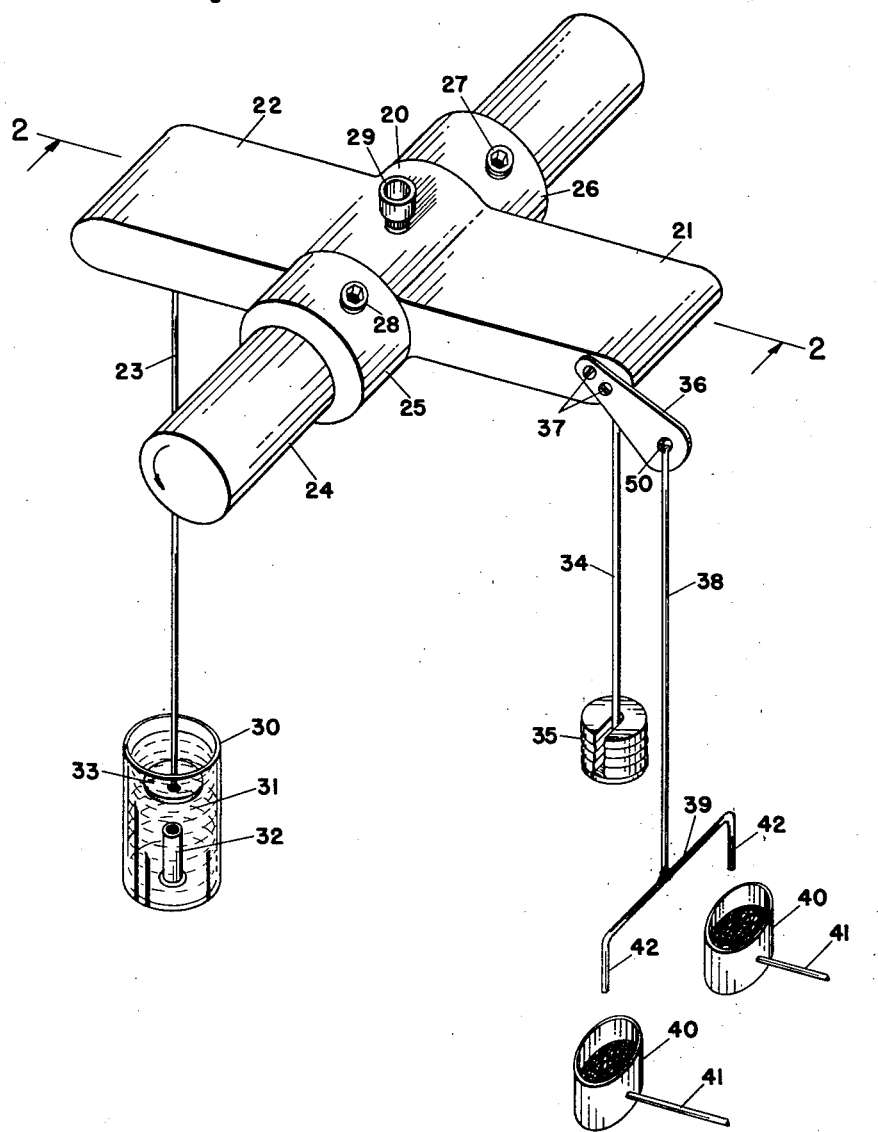
Figure 1 is an isometric view of the complete apparatus used to open and close an electrical circuit by means of a conducting bridge and mercury cups.
Figure 2:
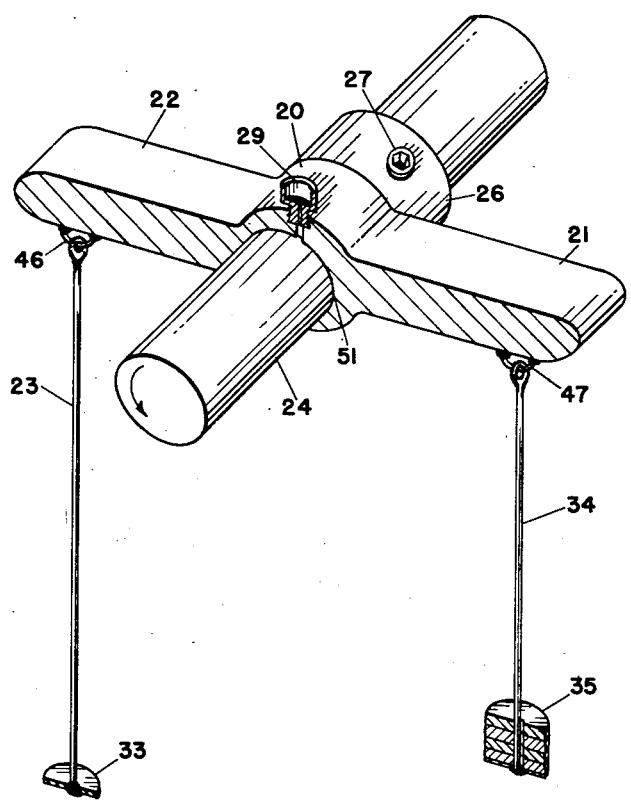
Figure 2 is an isometric view showing a cross section of the bearing member and its associated portions taken on the line 2—2 of Figure 1.

Referring to the accompanying diagram of the embodiment, sleeve bearing 20 is carried by shaft 24 and is freely rotatable about the shaft. Mounted rigidly on opposite sides of bearing member 20 are two rigid arms 21 and 22 which in this embodiment are approximately equal in weight. Arm 21 tends to rotate bearing member 20 in a direction opposed to the direction of rotation of the shaft, while arm 22 tends to rotate bearing member 20 in the same direction as the shaft. Suspended from arm 21 by means of a rod 34 is an adjustable counterweight 35, sufficient to give the bearing a slight unbalance in the direction opposite the rotation of shaft 24. The rod 34 is freely suspended from a metal loop 47 welded on the underside of the arm 21 and passing through an eye formed in the upper end of the rod. The eye is small enough to prevent any substantial amount of vertical movement of the rod with respect to arm 21 and yet large enough to allow the rod to hang vertically and freely. Suspended from the arm 22 is a rod 23 carrying at its lower end a flat disc 33 which moves in a generally vertical direction in the hydraulic damper 30. The rod 23 is suspended from the metal loop 46 through an eye formed in the upper end of the rod in a similar manner to rod 34 to allow rod 23 to move in a vertical direction on rotary movement of the bearing 20. Below the rod 23 and opposing the disc 33, a stop member 32 is positioned to limit the rotation of the bearing to a small fraction of one revolution in the direction of rotation of the shaft, or just sufficient to operate the external device.

Fluid is supplied between sleeve bearing 20 and the shaft 24 from a gravity-feed oil cup 29 threaded into the upper portion of the sleeve bearing 20. Secured to shaft 24 by means of set screws 27 and 28 are annular collars 25 and 26 provided to limit any motion of the tappet along the shaft parallel to the axis of rotation. To increase the torque transmitted by means of the fluid film, fluid may also be supplied between the adjacent surfaces of the collars and the bearing. In this case bearing surfaces are preferably provided.

Damper 30 is provided to smooth the operation of the device. The damper 30 contains a fluid 31 having a predetermined viscosity in which the disc 33 travels substantially vertically on movement of arm 22. The damping action is supplied by the resistance of the damping fluid to the motion of disc 33.

Referring particularly to Figure 1 which demonstrates one of the many uses to which the present device may be put, a mercury switch is shown to exemplify the operation of the device. Rigidly secured to the heavy arm 21 by means of the screws 37 is an insulator arm 36 of Bakelite or other suitable material. Suspended freely from insulator 36 through the hole 50 therein by means of the rod 38 is a conducting bridge 39 carrying two spaced contacts 42. Spaced below contacts 42 are mercury cups 40 connected in an external electrical circuit by means of the conductors 41.

The operation of the embodiment described above will now be outlined. When the shaft is at rest the contacts 42 are immersed in the mercury held by mercury cups 40 thus closing the external circuit through bridge 39. When the shaft is started, it exerts a torque on the oil film 51 distributed on the surface between the bearing 20 and the shaft 24. When the drag on the oil film is sufficient, the unbalance of the device is overcome, and the bearing is rotated in the same direction as the shaft, lifting the contacts 42 from the mercury cups to break the external circuit. The device continues to turn at a rate depending upon the viscosity of the fluid film 51 and the liquid 31 contained in the hydraulic damper. The motion of the device is stopped when the disc 33 at the end of rod 23 bears against the stop 32.

When the shaft is coming to a stop the torque exerted by the shaft on the oil film 51 is gradually diminished until it is insufficient to overcome the unbalance on the sleeve bearing. The device slips back toward its initial position at a rate depending on the viscosity of the liquid film 51 and the viscosity of the damping fluid 31. When its initial position is again reached, the contacts 42 are immersed in the mercury contained in cups 40 and the circuit is once more closed through the bridge 39. By choosing a relatively viscous liquid in the damper and a relatively viscous liquid at the bearing surface, the action of the tappet may be delayed until after the shaft has ceased rotating.

Although the present invention has been described with reference to a specific embodiment it will be understood that it is by no means limited to this embodiment. For example, it is possible to use the present device for operating pneumatic relays or other electrical switches, such as microswitches and the like. By suitable lever arrangements it may be used to operate mechanical device as well, to accomplish such tasks as starting a timer and so on.

The tappet may be carried in an annular recess in the shaft to prevent axial movement of the bearing. When this is done, it is desirable to fabricate the device in two sections adapted to be bolted together with the bearing in the annular recess. With this construction, it is preferred that all contacting surfaces of the bearing and shaft be supplied with fluid.

Other alternatives will be apparent to those skilled in the art.

Since many embodiments might be made of the present invention and since many changes might be made in the embodiment described, it is to be understood that the foregoing description is to be interpreted as illustrative only and not in a limiting sense.

I claim:

1. A tappet driven by the rotation of a shaft to operate a device a short time from the instant the shaft is at a dead stop which comprises, in combination, a sleeve bearing carried on said shaft and freely rotatable thereabout, a pair of arms mounted rigidly on opposite sides of said bearing, one of said arms being adjustably heavier than the other of said arms for causing rotation of said bearing in a direction opposite to the direction of rotation of said shaft, means for transmitting the torque developed by the rotation of said shaft to said bearing consisting essentially of a liquid film between said bearing and said shaft, a stop to limit the rotary movement of said bearing to less than one revolution, a damper for smoothing the movement of said bearing and means for transmitting the movement of said bearing to said device.

2. Apparatus for making and breaking an electrical circuit operable by the rotation of a driven shaft a predeterminable time interval from dead stop position of said shaft, said apparatus comprising, in combination, a sleeve bearing carried on said shaft and freely rotatable thereabout, a pair of arms mounted rigidly on opposite sides of said bearing, one of said arms being adjustably heavier than the other of said arms for causing rotation of said bearing in a direction opposite to the direction of rotation of said shaft, means for transmitting the torque developed by the rotation of said shaft to said bearing consisting essentially of a liquid film between said bearing and said shaft, a stop to limit the rotary movement of said bearing to less than one revolution, an electrical contact operably mounted on one of said arms for movement therewith and a second electrical contact operably positioned with respect to said first contact in said electrical circuit.

3. Apparatus for making and breaking an electrical circuit operable by the rotation of a driven shaft a predeterminable time interval from dead stop position of said shaft, said apparatus comprising, in combination, a sleeve bearing carried on said shaft and freely rotatable thereabout, a pair of arms mounted rigidly on opposite sides of said bearing, one of said arms being adjustably heavier than the other of said arms for causing rotation of said bearing in a direction opposite to the direction of rotation of said shaft, means for transmitting the torque developed on rotation of said shaft to said bearing consisting essentially of a liquid film between said bearing and said shaft, a stop to limit the rotary movement of said bearing to less than one revolution, a damper for smoothing the movement of said bearing, an electrical contact operably mounted on one of said arms for movement therewith and a second electrical contact operably positioned with respect to said first contact in said electrical circuit.

4. Apparatus for making and breaking an electrical circuit operable by the rotation of a driven shaft a predeterminable time interval from dead stop position of said shaft, said apparatus comprising, in combination, a sleeve bearing carried on said shaft and freely rotatable thereabout, a pair of arms mounted rigidly on opposite sides of said bearing, one of said arms being adjustably heavier than the other of said arms for causing rotation of said bearing in a direction opposite to the direction of rotation of said shaft, means for transmitting the rotational torque developed by said shaft to said bearing consisting essentially of a liquid film between said bearing and said shaft, a stop to limit the rotary movement of said bearing to less than one revolution, a damper for smoothing the movement of said bearing, a conducting bridge operably mounted on the heavier of said arms for movement therewith and a pair of mercury contacts operably positioned with respect to said conducting bridge in said electrical circuit.

QUENTIN J. EVANS.

REFERENCES CITED

The following references are of record in the file of this patent:

UNITED STATES PATENTS

| Number | Name | Date |
|---|---|---|
| 564,168 | Tower | July 14, 1896 |
| 609,274 | Gill | Aug. 16, 1898 |
| 949,994 | Callan | Feb. 22, 1910 |
| 1,410,308 | Holt | Mar. 21, 1922 |
| 1,985,930 | Kilkenny | Jan. 1, 1935 |
| 2,470,928 | Halter | May 24, 1949 |

FOREIGN PATENTS

| Number | Country | Date |
|---|---|---|
| 102,644 | Sweden | July 31, 1941 |